(12) United States Patent
Gerszberg et al.

(10) Patent No.: US 7,047,012 B1
(45) Date of Patent: May 16, 2006

(54) METHOD AND SYSTEM FOR PROVIDING ACCESS TO A TELECOMMUNICATIONS NETWORK

(75) Inventors: Irwin Gerszberg, Kendall Park, NJ (US); Jesse Eugene Russell, Piscataway, NJ (US); Robert Edward Schroeder, Township of Morris, Morris County, NJ (US)

(73) Assignee: Cingular Wireless II, LLC, Atlanta, GA (US)

( * ) Notice: Subject to any disclaimer, the term of this patent is extended or adjusted under 35 U.S.C. 154(b) by 983 days.

(21) Appl. No.: 08/868,407

(22) Filed: Jun. 3, 1997

(51) Int. Cl.
*H04Q 7/20* (2006.01)

(52) U.S. Cl. .................................................... 455/445
(58) Field of Classification Search ................ 455/433, 455/461, 446, 445, 403, 404.1, 414.1, 415, 455/414.2, 416, 417, 405–409; 379/88.21, 379/355.01, 350
See application file for complete search history.

(56) References Cited

U.S. PATENT DOCUMENTS

| 4,054,756 | A | * | 10/1977 | Comella et al. | ......... 379/88.26 |
| 4,763,191 | A | | 8/1988 | Gordon et al. | |
| 4,802,199 | A | | 1/1989 | Lange et al. | |
| 4,821,310 | A | * | 4/1989 | Lynk et al. | .................. 455/517 |
| 5,247,571 | A | | 9/1993 | Kay et al. | |
| 5,315,637 | A | * | 5/1994 | Breeden et al. | .............. 455/445 |
| 5,329,578 | A | * | 7/1994 | Brennan et al. | ............. 455/461 |
| 5,353,331 | A | * | 10/1994 | Emery et al. | ................ 455/461 |
| 5,402,470 | A | | 3/1995 | DeVaney | |
| 5,475,735 | A | * | 12/1995 | Williams et al. | ............. 455/445 |
| 5,504,804 | A | * | 4/1996 | Widmark et al. | ............ 455/445 |
| 5,530,945 | A | | 6/1996 | Chavez, Jr. et al. | |
| 5,539,817 | A | | 7/1996 | Wilkes | |
| 5,555,447 | A | * | 9/1996 | Kotzin et al. | .................. 455/72 |
| 5,621,729 | A | | 4/1997 | Johnson et al. | |
| 5,689,548 | A | * | 11/1997 | Maupin et al. | ........... 455/404.1 |
| 5,710,805 | A | * | 1/1998 | Armbruster et al. | ......... 455/433 |
| 5,745,551 | A | * | 4/1998 | Strauch et al. | ............... 455/413 |
| 5,839,067 | A | * | 11/1998 | Jonsson | ....................... 455/445 |
| 5,933,778 | A | * | 8/1999 | Buhrmann et al. | .......... 455/461 |
| 6,078,804 | A | * | 6/2000 | Alperovich et al. | ...... 455/404.1 |

FOREIGN PATENT DOCUMENTS

| CA | 2127940 | 3/1995 |
| CA | 2221401 | 6/1998 |
| EP | 0 462 728 | 12/1991 |
| WO | WO 96/35302 | 11/1996 |
| WO | WO 97/04615 | 2/1997 |

OTHER PUBLICATIONS

A first Canadian Office Action (Canadian Patent Application No. 2,231,928) dated Jan. 20, 2000.
A second Canadian Office Action (Canadian Patent Application No. 2,231,928) dated Apr. 10, 2001.
European Search Report (European Patent Application No. 98301494.5) dated Jul. 21, 1999.
Republication of the European Search Report (European Patent Application No. 98301494.5) dated Sep. 1, 1999.

* cited by examiner

*Primary Examiner*—Nay Maung
*Assistant Examiner*—Edan Orgad
(74) *Attorney, Agent, or Firm*—Banner & Witcoff, Ltd.

(57) ABSTRACT

A system and a method for connecting a call through a telecommunications network. A base station, connected to a public switched telephone network, includes a call processor, a memory and a transceiver. The memory includes a database containing dialing instructions for a wireless station for a telephone connection through the public switched telephone network to a destination station. The transceiver receives a call request from the wireless station, and the call processor in response to the call request, accesses the database and dials a call for connection through the public switched telephone network to the destination station based on the dialing instructions for the wireless station.

22 Claims, 2 Drawing Sheets

METHOD AND SYSTEM FOR PROVIDING ACCESS TO A TELECOMMUNICATIONS NETWORK

BACKGROUND OF THE INVENTION

1. Field of the Invention

The present invention relates to the field of telecommunications. More particularly, the present invention relates to a system and a method for establishing a connection through a telecommunications network.

2. Description of the Related Art

In conventional telecommunications systems, a user desiring fast, efficient telecommunications connection service will often lease a dedicated line from a telephone service provider. For example, the rail industry, trucking industry, overnight mail delivery services, FBI, Secret Service, large utility companies along with various federal, state and local-government agencies require that wireless telecommunications be rapidly delivered over a large geographical area. Presently, this is done by leasing dedicated lines from base stations to a central switching location.

The expenses for such a leased line are usually paid on an expensive one-time or monthly basis, and may be disproportionate for the actual usage time for the line since the majority of base stations are sporadically used. Often, multiple base stations are connected to one line and these conventional dedicated multi-drop circuits are difficult to reconfigure as the user's requirements change. Additionally, the individual circuit legs of dedicated connections trouble prone with noise, unbalance and are difficult to fault isolate and reroute, tending to prolong service outage(s). Further, there is no network redundancy with dedicated lines because of the high leased facility costs, and expensive-maintenance and operation costs. Conventional leased lines also lack inter-networking capability across multi-networks, do not support station mobility (i.e., roaming), and lack enhanced communication features.

Consequently, there is a need for rapid telecommunications connections without the attendant expense and other disadvantages associated with conventional leased lines.

SUMMARY OF THE INVENTION

The present invention provides rapid telecommunications connections without the expense and other disadvantages associated with conventional leased lines. The advantages of the present invention are provided by a system and a method for connecting a call through a telecommunications network. According to the invention, a base station, connected to a public switched telephone network, includes a call processor, a memory and a transceiver. The memory includes a database containing dialing instructions for a wireless station for a telephone connection through the public switched telephone network to a destination station. The transceiver receives a call request from the wireless station, and the call processor in response to the call request, accesses the database and dials a call for connection through the public switched telephone network to the destination station based on the dialing instructions for the wireless station.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides an efficient, low-cost solution for providing a priority line connection telecommunications service that can be quickly established via a public switched telephone network (PSTN) without incurring the high costs associated with a conventional dedicated-line service. The present invention is advantageously used by a telecommunications user for rapidly establishing time-critical connection paths to a destination station while receiving economical usage rates for a PSTN connection. According to the invention, multiple users may use an established connection through the PSTN service to create a time-shared system that rapidly and effectively establishes and drops call connections in accordance with expected user traffic schedules. Additionally, well-known DTMF detection and removal techniques can be used for further enhancing the rapid, telecommunications interconnection service provided by the present invention.

Figure 1:
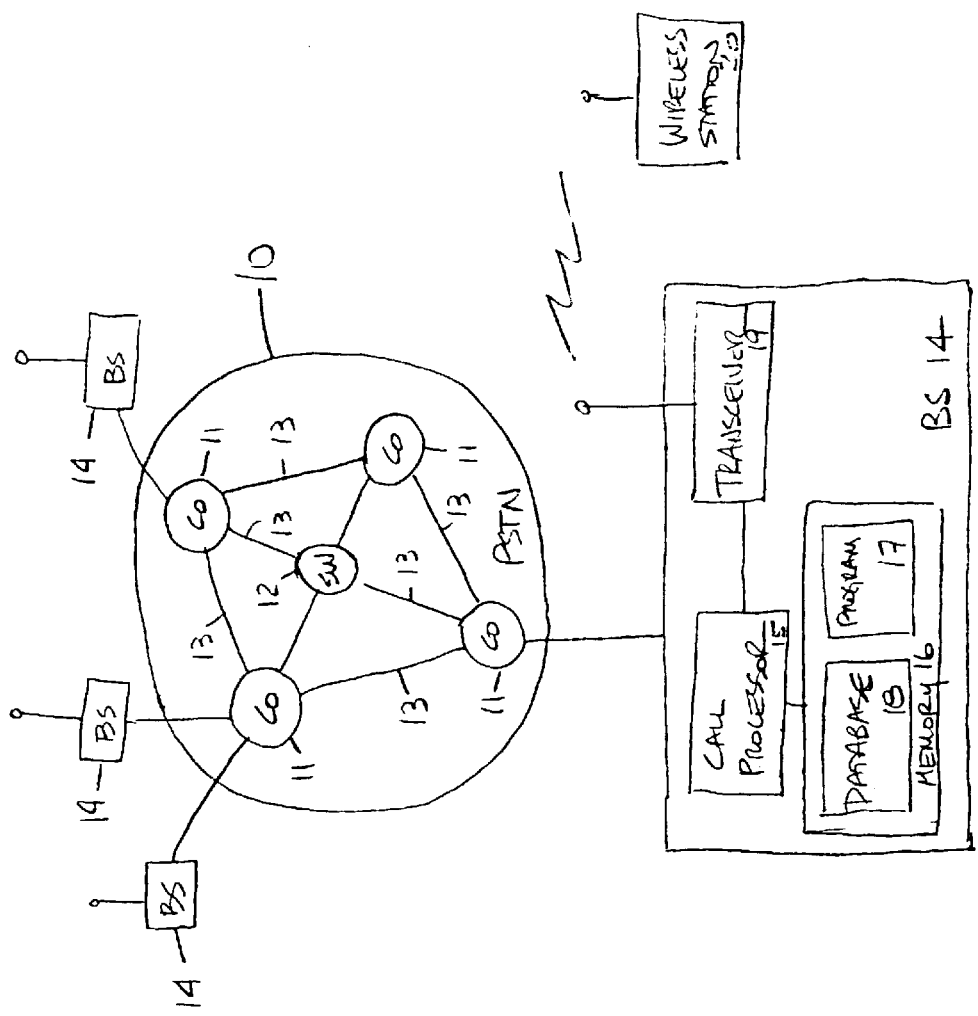
FIG. 1 shows a schematic block diagram of a system for accessing a telecommunications network according to the present invention.

FIG. 1 shows a schematic block diagram of a system for rapidly establishing a connection through a public switched telephone network (PSTN) 10 according to the present invention. PSTN 10 includes a plurality of switches (SW) 11 and central offices (CO) 12 that are interconnected by trunks 13. A plurality of base stations 14 are connected to the central offices in a well-known manner. Base stations 14 communicate in a well-known manner with wireless terminals, of which only wireless terminal 20 is shown. Wireless terminal 20 can be stationary or mobile.

Each base station 14 includes a call processor 15 coupled to a memory 16 and to a transceiver 19. Memory 16 includes a program data space portion 17 where information for call processor 15 is stored, and a memory space portion 18 in which a user database is stored. User database 18 includes information relating to user dialing information for each wireless station 20. User database 18 also includes call routing information for each wireless station 20 to selected destination stations. Call processor 15 performs audio and tone detection, storage, and removal in connection with ISDN and/or POTS line interfacing and digital speech processing. When ISDN service is unavailable, call processor 15 provides a capability for POTS dial up line for voice only and for an X.25 line for a control interface. Transceiver 19 operates in a well-known manner in communicating with mobile station 20.

Figure 2:
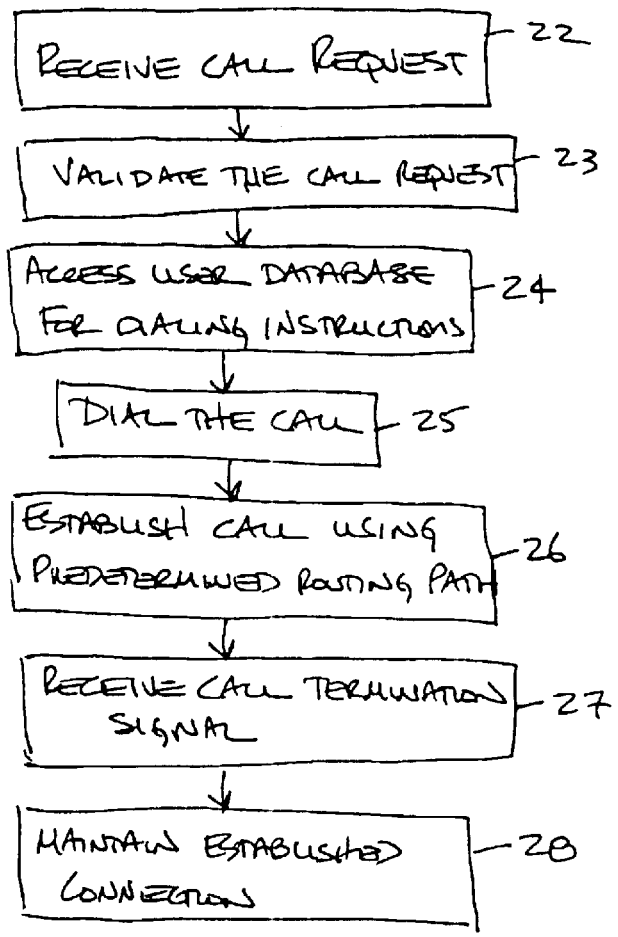
FIG. 2 shows a flow diagram for the operation of a system for accessing a telecommunications network according to the present invention.

FIG. 2 shows a flow diagram for the operation 21 of a system for accessing a telecommunications network according to the present invention. Upon receiving a call request from wireless station 20 that uniquely identifies station 20 at step 22, such as a station identification number, for example, call processor 15 validates the call request at step 23 and accesses user database 18 at step 24 for obtaining dialing instructions associated with wireless station 20. Call processor 15 then dials the destination station at step 25 in accordance with the dialing instructions for the wireless station for establishing a telecommunications connection at step 26, via PSTN 10, to a destination station using a predetermined routing path associated with station 20 and the destination station of the call. Once the call is completed, the connection is disconnected by a termination signal from either wireless station 20 or the destination station at step 27.

Base station 14 also records user voice signals into memory 16 so that the user may hang up before the connection to the destination station is established, thus reducing waiting time for the user, especially for short conversational purposes. When the connection is established, base station 14 then reproduces the voice signals for the destination station. Additionally, the predetermined connection path may be shared by a plurality of different users on a time-sharing basis where specific time periods are scheduled for each user. The predetermined connection path may be maintained after it is established at step 28, even after user termination signaling, for further enhancing rapid telecommunications connectivity for subsequent calls or scheduled predetermined path connection times in response to daily traffic patterns.

While the present invention has been described in connection with the illustrated embodiments, it will be appreciated and understood that modifications may be made without departing from the true spirit and scope of the invention.

What is claimed is:

1. A method for connecting a call through a telecommunications network, the method comprising the steps of:
   receiving a request for a call at a base station from a wireless station;
   accessing a database at the base station containing dialing instructions for the wireless station for a rapidly-established telephone connection through a public switched telephone network to a destination station;
   dialing a call for a rapidly-established telephone connection through the public switched telephone network to the destination station based on the dialing instructions for the wireless station; and
   establishing the rapidly-established telephone connection for the call from the base station to the destination station using a predetermined routing path through the public switched telephone network based on the dialing instructions for the wireless station.

2. The method according to claim 1, wherein the step of receiving a request for a call includes the steps of receiving voice signals, and
   storing the received voice signals,
   the method further comprising the step of:
   transmitting the stored voice signals to the destination station when the call is connected through the public switched telephone network.

3. The method according to claim 2, wherein the wireless station is a mobile station.

4. The method according to claim 2, wherein the step of establishing the connection for the call establishes a connection that is time-shared with other wireless stations.

5. A base connected to a public switched telephone network, the base station comprising:
   a transceiver receiving a call request from a wireless station;
   a memory containing a database, the database containing dialing instructions for the wireless station for a rapidly-established telephone connection through the public switched telephone network to a destination station; and
   a call processor responsive to the call request by accessing the database and dialing a call for a rapidly-established telephone connection through the public switched telephone network to the destination station based on the dialing instructions for the wireless station, wherein the rapidly-established telephone connection established for the call from the base station to the destination station is a predetermined routing path through the public switched telephone network based on the dialing instructions for the wireless station.

6. The base station according to claim 5, wherein the memory stores voice signals received by the transceiver from the wireless station prior to the call processor accessing the database, the stored voice signals being transmitted to the destination station when the call is connected through the public switched telephone network.

7. The base station according to claim 6, wherein the wireless station is a mobile station.

8. The base station according to claim 6, wherein the connection established for the call is a connection that is time-shared with other wireless stations.

9. A method for connecting a call through a telecommunications network, the method comprising the steps of:
   receiving a request for a call at a base station from a wireless station;
   accessing a database at the base station containing dialing instructions for the wireless station for a telephone connection through a public switched telephone network to a destination station;
   dialing a call for connection through the public switched telephone network to the destination station based on the dialing instructions for the wireless station; and
   establishing a connection for the call from the base station to the destination station using a predetermined routing path through the public switched telephone network based on the dialing instructions for the wireless station.

10. The method according to claim 9, wherein the step of receiving a request for a call includes the steps of receiving voice signals, and
    storing the received voice signals,
    the method further comprising the step of:
    transmitting the stored voice signals to the destination station when the call is connected through the public switched telephone network.

11. The method according to claim 10, wherein the wireless station is a mobile station.

12. The method according to claim 10, wherein the step of establishing the connection for the call establishes a connection that is time-shared with other wireless stations.

13. A base station connected to a public switched telephone network, the base station comprising:
    a transceiver receiving a call request from a wireless station;
    a memory containing a database, the database containing dialing instructions for the wireless station for a telephone connection through the public switched telephone network to a destination station; and
    a call processor responsive to the call request by accessing the database and dialing a call for connection through the public switched telephone network to the destination station based on the dialing instructions for the wireless station, a connection established for the call from the base station to the destination station being a predetermined routing path through the public switched telephone network based on the dialing instructions for the wireless station.

14. The base station according to claim 13, wherein the memory stores voice signals received by the transceiver from the wireless station prior to the call processor accessing the database, the stored voice signals being transmitted to the destination station when the call is connected through the public switched telephone network.

15. The base station according to claim 14, wherein the wireless station is a mobile station.

16. The base station according to claim 14, wherein the connection established for the call is a connection that is time-shared with other wireless stations.

17. A method for connecting a call through a telecommunications network, the method comprising the steps of:

receiving a request for a call at a base station from a wireless station;

receiving voice signals when the request for the call is received;

storing the voice signals;

accessing a database at the base station containing dialing instructions for the wireless station for a telephone connection through a public switched telephone network to a destination station;

dialing a call for a connection through the public switched telephone network to the destination station based on the dialing instructions for the wireless station; and transmitting the stored voice signals to the destination station when the call is connected through the public switched telephone network.

18. The method according to claim 17, wherein the wireless station is a mobile station.

19. The method according to claim 17, wherein the step of establishing the connection for the call establishes a connection that is time-shared with other wireless stations.

20. A base station connected to a public switched telephone network, the base station comprising:

a transceiver receiving a call request from a wireless station, the call request including voice signals;

a memory containing a database, the database containing dialing instructions for the wireless station for a telephone connection through the public switched telephone network to a destination station; and a call processor responsive to the call request by storing the voice signals in the memory, accessing the database and dialing a call for connection through the public switched telephone network to the destination station based on the dialing instructions for the wireless station, the call processor transmitting the stored voice signals to the destination station when the call is connected through the public switched telephone network.

21. The base station according to claim 20, wherein the wireless station is a mobile station.

22. The base station according to claim 20, wherein the connection established for the call is a connection that is time-shared with other wireless stations.

* * * * *